J. H. STEWART & J. C. HEINICKEL.
COMBINED ROTARY HARROW, ROLLER, AND CUTTER.
APPLICATION FILED APR. 5, 1909.
930,323.
Patented Aug. 3, 1909.
2 SHEETS—SHEET 1.
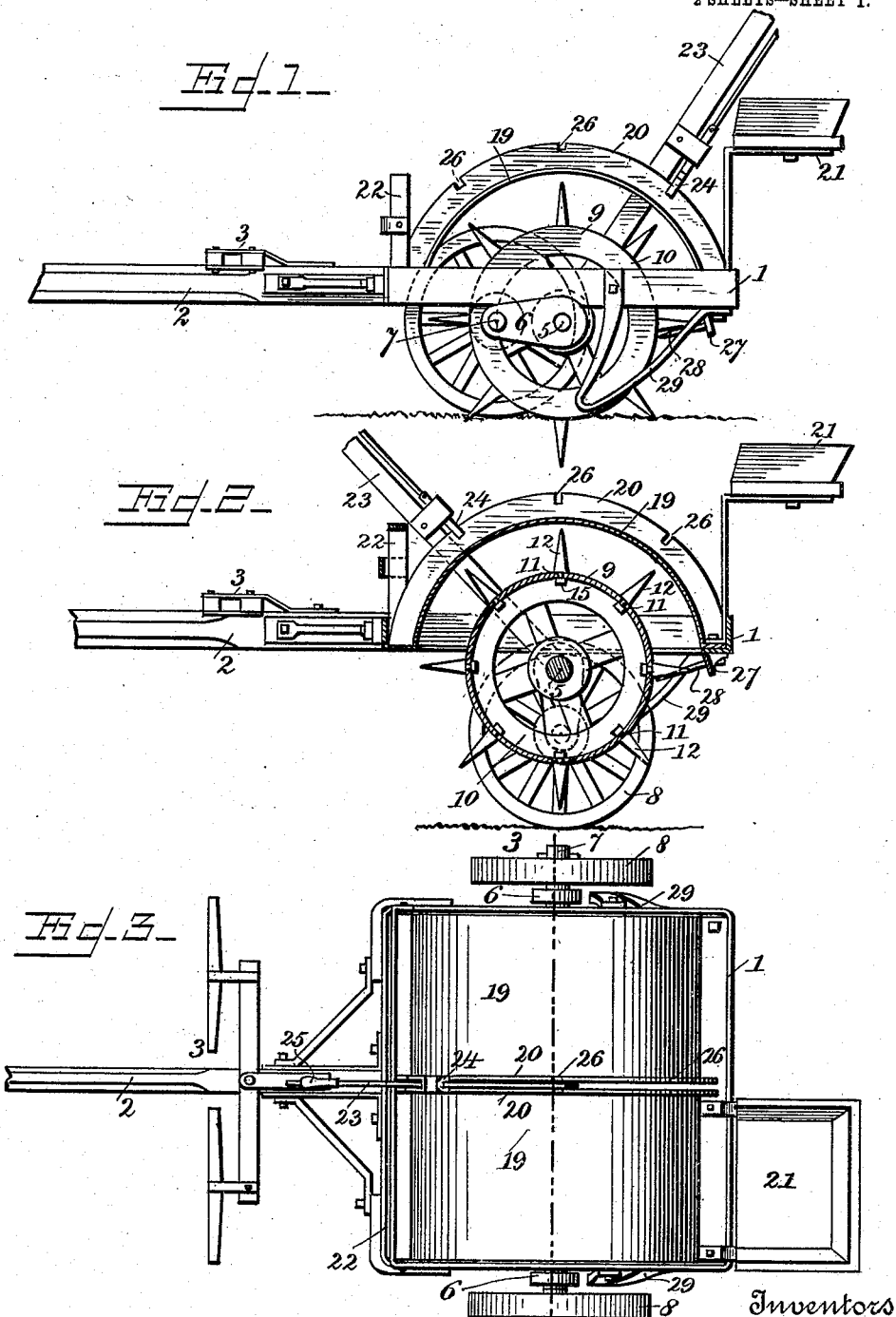
Witnesses
F. L. Ourand
C. H. Griesbauer
Inventors
J. H. Stewart
J. C. Heinickel
by H. B. Willson & Co.
Attorneys

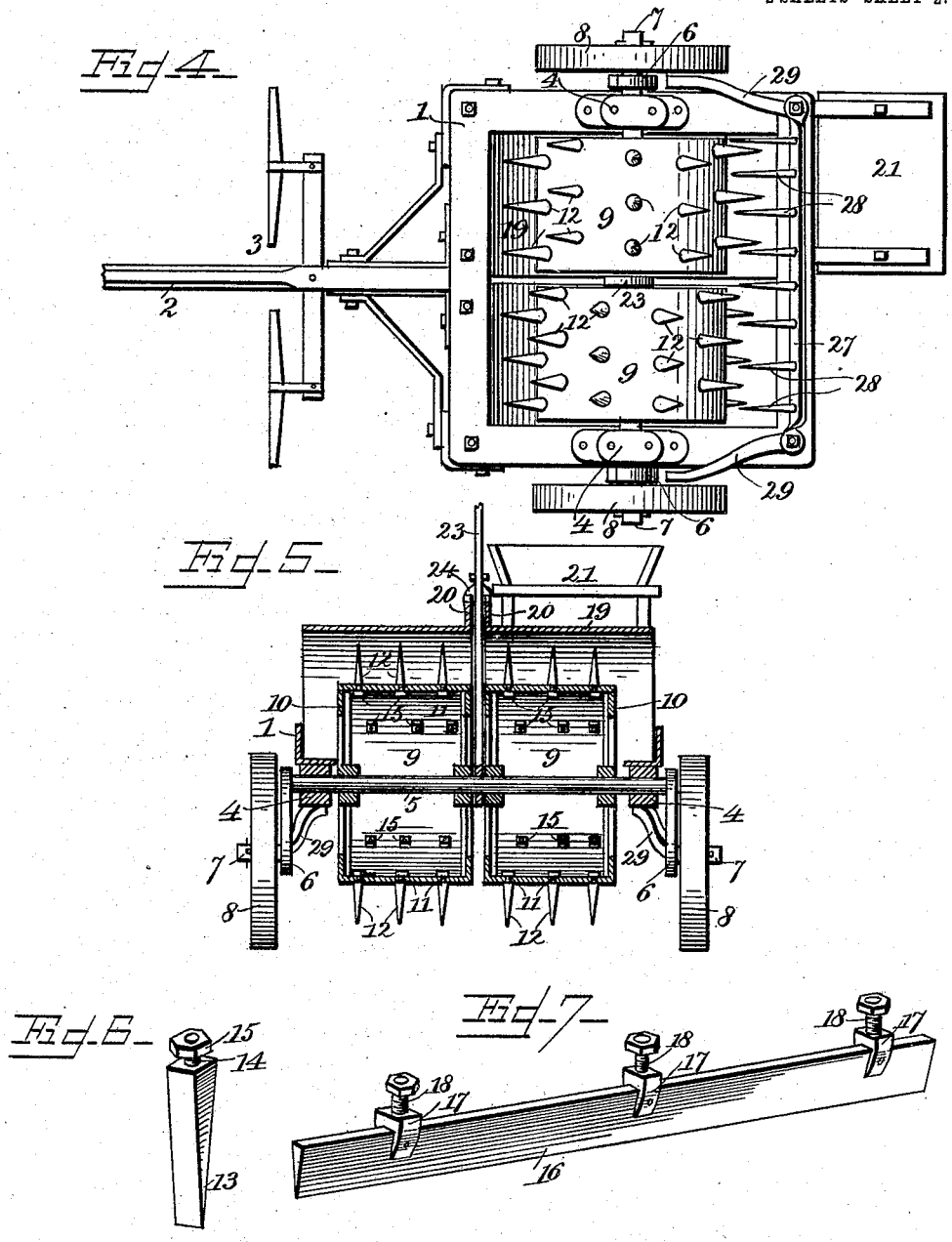

UNITED STATES PATENT OFFICE.

JOHN H. STEWART AND JOHN CHARLEY HEINICKEL, OF STAUNTON, INDIANA.

COMBINED ROTARY HARROW, ROLLER, AND CUTTER.

No. 930,323. Specification of Letters Patent. Patented Aug. 3, 1909.

Application filed April 5, 1909. Serial No. 437,946.

*To all whom it may concern:*

Be it known that we, JOHN H. STEWART and JOHN C. HEINICKEL, citizens of the United States, residing at Staunton, in the county of Clay and State of Indiana, have invented certain new and useful Improvements in a Combined Rotary Harrow, Roller, and Cutter; and we do declare the following to be a full, clear, and exact description of the invention, such as will enable others skilled in the art to which it appertains to make and use the same.

This invention relates to improvements in combined rotary harrow, roller and stalk cutters.

The object of the invention is to provide a device of this character which may be employed as a rotary harrow for breaking up hard ground, a roller and clod crusher, and a stalk cutter for breaking down and chopping up stalks, weeds and the like, so that they may be readily plowed under the ground.

With the foregoing and other objects in view, the invention consists of certain novel features of construction, combination and arrangement of parts, as will be more fully described and particularly pointed out in the appended claims.

In the accompanying drawings, Figure 1 is a side view of the invention, showing the rollers lowered to an operative position; Fig. 2 is a vertical longitudinal sectional view, showing the rollers raised to an inoperative position; Fig. 3 is a top plan view; Fig. 4 is a bottom plan view; Fig. 5 is a transverse sectional view on the line 5—5 of Fig. 3; Fig. 6 is a detail view of a modified form of spike or tooth; and Fig. 7 is a detail view of a cutting bar or blade adapted to be used in connection with the machine.

Referring more particularly to the drawings, 1 denotes the supporting frame of the machine which may be of any suitable construction and shape and is here shown as of rectangular oblong form. To the front side of the frame is connected a draft tongue 2 having the usual whiffletrees or draft devices 3. Revolubly mounted in suitable bearings 4 on the under side of each end of the frame is a shaft or axle 5 on each end of which are secured crank arms 6 having in their outer ends laterally projecting spindles 7 on which are revolubly mounted supporting wheels 8.

Mounted on the shaft or axle 5 is one or more hollow rollers 9, said rollers being preferably formed of heavy sheet metal secured at its ends to heads 10, through which the shaft or axle 5 passes. In the body portions of the rollers 9 are formed a series of apertures 11 with which are adapted to be engaged a series of spikes or teeth 12 which may be tapered to a point, as shown in the first figures of the drawings, or may be chisel shaped, as shown at 13 in Fig. 6 of the drawings.

The teeth or spikes 12 and 13 are provided on their inner ends with reduced threaded shanks 14 which are inserted through the apertures in the rollers and have screwed on their inner ends clamping nuts 15 by means of which the spikes are detachably secured to the rollers. In addition to the teeth or spikes 12 and 13 we also provide blades or cutting bars 16 which are adapted to be secured to the rollers in place of the spikes or teeth. The blades or bars 16 are here shown as being provided with a series of attaching bars 17 having threaded shanks 18 which are engaged with the apertures in the rollers and with said threaded ends are engaged clamping nuts whereby the blades are detachably secured to the rollers.

The spikes or teeth are employed for the purpose of breaking up hard ground to enable the same to be more readily plowed or to dig up the hard surface of a roadway to permit the same to be operated on by a road grader. The machine when equipped with toothed rollers may be also employed for preparing the ground for the planting of wheat, oats or similar grain. The blades or bars 16 are employed when the machine is to be used for cutting stalks, weeds and the like, said blades or bars breaking down and cutting up the stalks and weeds into short lengths so that they may be readily plowed under the ground. When it is desired to employ the machine as a roller or clod crusher both the teeth and the blades are removed from the rollers leaving the surface of the same perfectly smooth. When in this condition, the machine may be employed for any purpose where a roller may be utilized.

To the upper portion of the frame and extending over the tops of the rollers are guard plates 19. The inner ends of the plates 19 are spaced apart and provided with upwardly projecting right angularly formed flanges 20, the purpose of which will hereinafter appear. On the rear end of the frame, adjacent to one side thereof is arranged a driver's seat 21 and secured to the front end of the frame and projecting upwardly therefrom is a frame 22 which forms a fender to prevent the driver from being thrown over the front of the machine. The guard plates 19 are provided to protect the driver from the teeth or blades of the rollers.

Rigidly secured at its lower end to the shaft or axle 5, between the inner ends of the rollers is a lever 23 which projects upwardly between the flanged inner ends of the guard plates and is provided with a pawl 24 having an operating handle 25. The pawl 24 is adapted to be engaged with one of a series of notches 26 formed in the flanges 20 on the inner ends of the guard plates, said flanges thus forming segmental racks. By means of the lever 23, the shaft or axle together with the rollers and frame of the machine may be raised or lowered into inoperative and operative positions on the supporting wheels 8. When the lever is in the position shown in Fig. 1 of the drawings, the frame and rollers will be lowered and held in an operative position with the spikes or teeth in engagement with the ground. When the lever is in the position shown in Fig. 2 of the drawings, the frame will be elevated and the roller raised entirely out of engagement with the ground. By engaging the pawl of the lever with the intermediate notch in the flanges 20, the depth of the cut or engagement of the teeth with the ground is regulated so that the teeth will cut or enter the ground at a less depth than when the rollers are entirely down, as shown in Fig. 1.

Secured to the lower side of the rear cross bar of the frame, is a cleaning fork 27, the prongs or tines 28 of which project forwardly between the teeth or spikes of the rollers and serve to clean the same and prevent the accumulation of weeds or dirt on the rollers. Secured to the lower side of each of the side bars of the frame, adjacent to the rear ends thereof are downwardly projecting feet 29.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described our invention, what we claim is:

1. In a machine of the character described, a supporting frame, a cranked shaft revolubly mounted in said frame, supporting wheels on the cranked outer ends of said shaft, ground working rollers mounted on said shaft, guard plates over said rollers, a rack formed on said guard plates, a lever rigidly secured to said shaft to raise and lower the machine in inoperative and operative position, and a pawl carried by said lever and adapted to be engaged with the rack on said guard plates to hold the machine in operative or inoperative position.

2. In a machine of the character described, a supporting frame, a cranked shaft revolubly mounted in said frame, supporting wheels journaled on the cranked ends of said shaft, ground engaging rollers mounted on said shaft, interchangeable ground working implements adapted to be detachably secured to said rollers, guard plates on said frame over said rollers, notched flanges formed on the inner ends of said guard plates to provide a rack, an operating lever secured at its lower end to said shaft and projecting upwardly between the flanged ends of said guard plates, and a pawl carried by said lever and adapted to engage the notches of said flanges, whereby the lever is held in its operative positions.

3. In a machine of the character described, a supporting frame, draft devices secured to said frame, a shaft revolubly mounted in said frame, cranks arranged on the outer ends of said shaft, spindles on said cranks, supporting wheels mounted on said spindles, ground engaging rollers mounted on said shaft, ground engaging teeth adapted to be detachably secured to said rollers, segmental guard plates arranged over the rollers and secured to the frame, right angular outwardly projecting flanges on the inner ends of said guard plates, said flanges having formed therein a series of notches whereby the flanges form a rack, an operating lever fixedly secured to said shaft and projecting upwardly through the flanged inner ends of the guard plates, a pawl carried by said lever and adapted to be engaged with the notches in said flanges to hold the lever in its adjusted positions, a seat arranged on one end of the frame, and a fender arranged on the opposite end thereof.

4. In a machine of the character described, a supporting frame, toothed rollers revolubly mounted in said frame, guard plates arranged over said rollers, flanges formed on said guard plates, said flanges being provided with a series of notches to provide a rack, an operating lever, a pawl carried by said lever and adapted to be engaged with the notches in the flanges of said guard plates whereby the lever is held in its adjusted positions.

In testimony whereof we have hereunto set our hands in presence of two subscribing witnesses.

JOHN H. STEWART.
J. CHARLEY HEINICKEL.

Witnesses:
JAMES T. WRIGHT,
CHARLES W. STEWART.